Oct. 13, 1959     J. M. ROWLAND     2,908,501

STOCK MARKET GAME

Filed April 28, 1955

INVENTOR
JASPER M. ROWLAND
BY Pennie, Edmonds,
Morton, Barrows and Taylor
ATTORNEYS

United States Patent Office 2,908,501
Patented Oct. 13, 1959

2,908,501

STOCK MARKET GAME

Jasper M. Rowland, Thornwood, N.Y.

Application April 28, 1955, Serial No. 504,515

15 Claims. (Cl. 273—148)

This invention relates to a novel game structure. More specifically, this invention relates to a game board on which symbols can be compared with a multiplicity of adjacent symbols, all of which can be simultaneously changed by movement of the relatively movable members on which the adjacent symbols appear. The game is particularly satisfactory for use as a game simulating stock market conditions.

The principal purpose of the game of the present invention is to provide mentally stimulating recreation. It has the advantage of flexibility in that it permits many or few players to play at one time. Used as a stock market game it is also educational in that it is an aid in simulation of trading in the way it occurs on the stock market.

The device of the present invention includes a sheet on which symbols are arranged in parallel columns and in equally spaced rows. An indicator which cooperates with the sheet bears a column of symbols arranged parallel to the columns on the sheet, and the symbols on the indicator have the same spacing as the rows of symbols on the sheet. This arrangement is intended to facilitate comparison of adjacent symbols in the adjacent columns on the sheet and on the indicator, respectively. The sheet and indicator are movable relative to one another so that their relative positions may be changed by movement in the direction of the rows or by movement in the direction of the columns, or both. The object of such movement is to modify the symbols on the sheet which appear adjacent the symbols on the indicator.

A primary advantage of this game device is its ability to match or pair a plurality of adjacent symbols on the sheet and indicator and to simultaneously modify every adjacent pair. The modifications occur in accordance with predetermined patterns in the rows of symbols on the sheet and the patterns may vary "up or down" in a great variety of ways. Moreover, by changing the row opposite a particular symbol on the indicator the pattern of symbols which will appear adjacent to the indicator is completely changed. Such an indexing change occurs simultaneously for all symbols on the indicator.

In the specific case of a game simulating stock market activity, the sheet bears numbers which represent prices and which are arranged in columns and rows, as previously described. The indicator bears stock or commodity names in a column with which the stock prices can be compared.

In normal stock market transactions, there are two general types of fluctuations of stock prices. One is caused by the bidding that accompanies buying and selling, whereas the other is caused by outside influences such as world news, announcement of government policies, etc. The former changes rarely amount to a major percentage of the prices, but the latter may represent material changes in stock prices. In prior art attempts to simulate stock market activities in games, the difference in nature of these two effects has been neglected. In fact, except in a few cases, prior art games have neglected the fact that stock fluctuations tend to follow any sort of pattern. Consequently, it has been common in prior art stock market games for changes in stock price to be determined by chance, as by the spinning of a dial. In those few cases which have employed some orderly pattern of fluctuation, however, all effects, whether normal fluctuations or business index changes, have been combined, so that the player does not come to distinguish the two. Moreover, in prior stock market games the prices of all stocks have not changed simultaneously and not all prices of all stocks have appeared on the board at the same time.

The present invention, when used for a stock market game, is intended to simulate on a small scale the "board" of a stock exchange. At all times, all of the stocks offered are shown on the board and have a price. It is intended that this board be used in such a way that all players are given an opportunity for trading any time the exchange is "open." That is, any player may buy or sell stock when any other player is able to do so and under the same conditions. The game of the present invention provides changes in stock values which might occur in actual trading, and realistic trends are predetermined and not left to chance. On the other hand, it is not possible to memorize these trends because any trend may be interrupted by a change in the market index simulating outside influences which in some cases materially alter the value of all the stocks on the market. Consequently, the element of chance is retained even for players who have played frequently. Moreover, this element of chance has a realistic effect which does, accordingly, make the game interesting even to experienced stock market traders.

For better understanding of the present invention, reference is made to the accompanying drawings, wherein.

Figure 1:
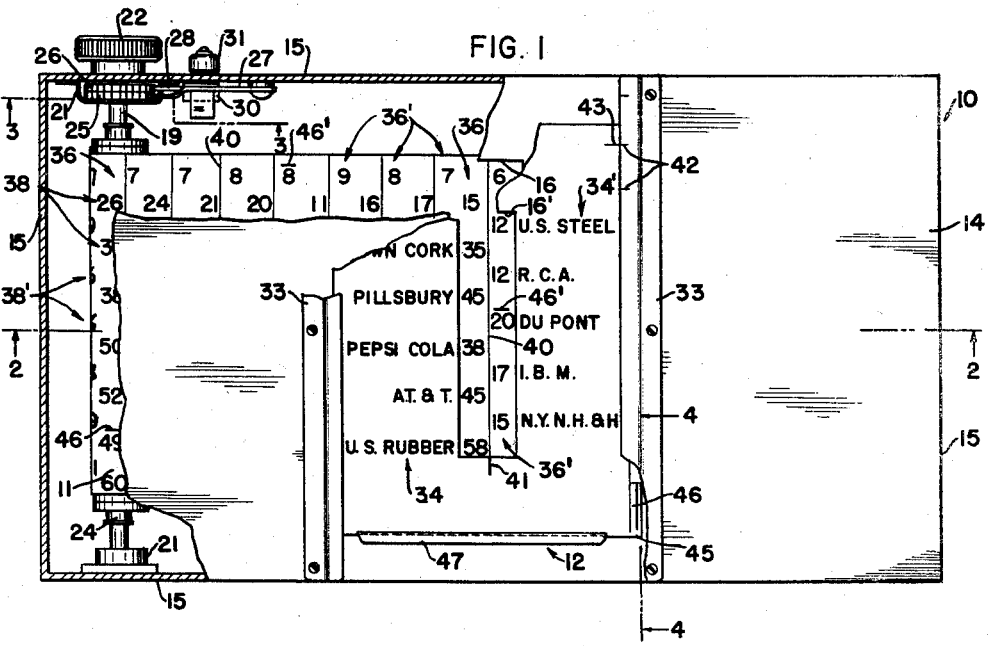
Fig. 1 is a plan view from above of a game device embodying the invention partially in section.
Figure 2:
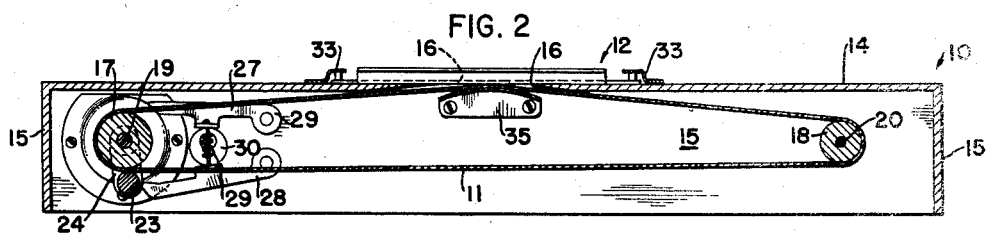
Fig. 2 is a sectional view of the structure of Fig. 1 taken along line 2—2 of Fig. 1 showing a preferred arrangement of the sheet.

Referring now to Figs. 1 and 2, this embodiment employs a frame which is an inverted shallow box generally designated 10. The sheet 11 is a tubular roll of paper and the indicator is a slide 12.

The box frame 10 is of elongated rectangular form and advantageously consists of a top cover 14 and side walls 15. The cover has an opening 16 through which in any embodiment of the invention may be seen at least one whole column of figures and through which in this embodiment may be seen two whole rows of figures.

Within the frame box 10 are a pair of rollers 17 and 18. These rollers are supported parallel to one another on shafts 19 and 20, respectively. The shafts, in turn, are rotatably supported on the side walls 15 in some sort of conventional support bearings 21, which may differ slightly from one another. The rollers are arranged at opposite sides of the opening 16 in such a way that they will support the tubular sheet 11. It is desirable that the spacing of the rollers within this tubular sheet be such that the said sheet may be held relatively taut between the rollers. Advantageously, a handle 22 is secured to shaft 19 so that said handle lies at least partially outside the cover. In the present embodiment, the shaft 19 extends through one of its supporting side walls to support the handle 22. Handle 22 is accordingly accessible for rotation to produce rotation of roller 17.

In order to insure that the tubular sheet will move in response to the rotation of the handle, an idler roller 23 is provided. Idler 23 is located relative to roller 17 in such position that the tubular sheet 11 will pass between it and the roller. Idler 23 and roller 17 preferably have resilient surfaces, covered with material such as rubber which also provides good frictional properties with paper. The roller and the idler are urged together by a coupling member 24 between them. This coupling 24 may include a resilient member such as a spring of some sort, or it may rely on the resilience of the roller and idler to exert pressure on the tubular sheet 11 between them.

Figure 3:
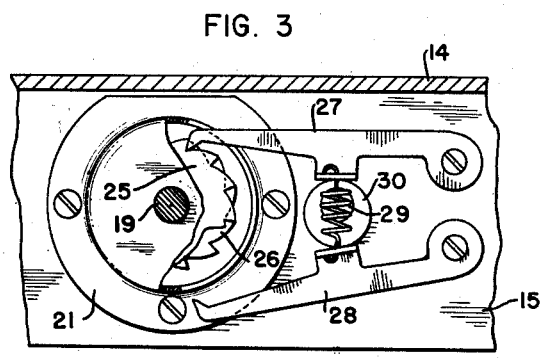
Fig. 3 is a partial view taken along line 3—3 of Fig. 1 and showing a ratchet construction useful in this embodiment.

A ratchet structure may also be employed with roller 17. In this embodiment a double ratchet is employed to permit a selection of the direction of turning but to prevent turning the other way once the selection has been made. The saw tooth wheels 25 and 26 of said ratchet are advantageously fixed to shaft 19 coaxial to said shaft. The pawls 27 and 28 are rotatably supported on a side wall 15 in a position to be able to engage their respective saw tooth wheels (see particularly Fig. 3). A spring 29 is connected between pawls 27 and 28. An eccentric cam 30 is provided between the pawls to oppose spring 29 and prevent said pawls from being pulled together and to permit of one of the pawls to cooperate with its respective saw tooth wheel. A handle 31 is mounted on the cam's axis of rotation outside of wall 15 where it is accessible for adjustment of the cam's position. Rotation of this handle 90° will urge pawl 29 out of contact with wheel 25 but not permit pawl 28 to contact wheel 26. An additional 90° of rotation (180° from the position shown) will make pawl 28 contact wheel 26 while pawl 27 is kept away from wheel 25.

In the preferred form of the invention, the indicator 12 is a metallic slide which is slidably engaged by guides 33 on the cover 14 of frame 10. The slide is provided with at least one column and, in the case illustrated, two columns of symbols, which in this case are names of stocks. These columns 34 and 34' are arranged on opposite sides of the window 16' which is sufficiently long to show prices opposite each of the stocks, but preferably not as long as the whole column of symbols on the sheet.

The sheet is arranged to pass adjacent the window over a guide 35 which holds said sheet close to the window so that it may be conveniently read.

The sheet has arranged on its columns which extend transverse to the sheet or along tubular elements thereof. These columns contain numbers which represent stock values. In this embodiment, there are two sets of columns 36 and 36' which are intended to be compared with columns 34 and 34', respectively, on the indicator slide 12. The numbers, in addition to forming columns, also fall in parallel rows 38 and 38' generally perpendicular to the columns. The rows 38 are spaced the distance between the stocks in column 34 with which they are to be compared. Similarly, the rows 38' are spaced the distance between the stocks in column 34' with which they are to be compared. These rows 38 and 38' are offset or staggered from one another. This staggering is intended to prevent confusion in reading stock prices. In another simpler embodiment of the invention, only one column need be employed on the indicator which would eliminate the need for staggered rows and, in fact, for two sets of rows.

Each stock in the columns 34 and 34' on slide 12 is supposed to be aligned with one of the rows 38 and 38' on the sheet, and one of each of the rows 36 and 36' on the sheet is positioned adjacent columns 34 and 34', respectively. There are fewer stocks listed in the columns 34 and 34' than there are prices listed in columns 36 and 36', respectively. To the left of column 36 and to the right of column 36 are lines 40. These lines 40 may be aligned with a marker 41 on the slide indicator 12 so that the line 40 will be at the middle of the portion of the sheet seen through the window 16' in order to aid the proper line-up of the columns on the sheet relative to the columns on the slide indicator. Alignment may also be aided by the ratchet which tends to cause the driven and hence the sheet to seek discrete positions.

The slide indicator and the frame also bear a set of markings. In this instance one of the slide members 33 bears a plurality of index marks 42. The slide 12 bears a single mark 43, with which the marks 42 are aligned. Changing the position of mark 43 opposite index marks 42 by moving the slide relative to the frame changes the row that appears opposite a particular stock on the indicator. The marks 42 are spaced apart the distance between rows 38, which is also the distance between rows 38'.

Figure 4:
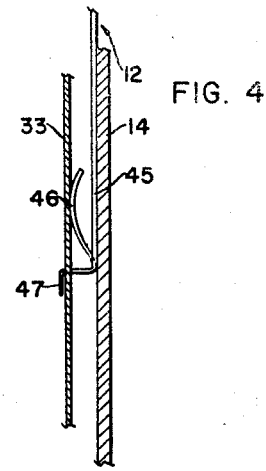
Fig. 4 is a sectional detail taken along line 4—4 of Fig. 1 showing one possible construction of the slide portion of the indicator.

Referring to Figure 4 a particularly advantageous slide construction is illustrated. In this construction, slide feet 45 on indicator slide 12 extend into the respective slots provided between cover 14 and guides 33. A leaf spring 46 is provided on each of the feet 45 to apply tension between the cover 14 and the guide 33 in order to hold the slide in any selected position relative to the frame. This construction permits manual movement of the indicator relative to the cover in the direction of the columns (i.e., parallel to the columns on the sheet). This movement is facilitated by flange handle 47 on the indicator 12.

In some cases it will be of advantage to construct one of the side walls 15 so that it can be removed, to permit removal of tubular sheet 11. It will, of course, be necessary also to loosen the connection between roller 17 and idler 23. The tubular member can then be slid off the rollers 17 and 18 and the guide 35 and replaced, if desired. The device of the present invention is structurally sufficiently simple that a detailed explanation of how it may be constructed appears to be unnecessary.

In using the game of the present invention, the sheet is preferably moved so that one line 40 after another may be matched with the marker 41 on the indicator. In other words, the columns 36 are arranged to appear in sequence adjacent the names of stock in column 34. Likewise, the columns 36' are made to appear in sequence adjacent the stock in column 34'. As a consequence the various stocks will be given a series of selling prices. In playing the game, the sheet is moved in one direction without skipping any column. The ratchet is positioned to permit movement only in one direction. Either direction may be selected, but once selected it should not be changed in the course of a game. It is, of course, possible to omit the ratchet, but in addition to maintaining one direction of movement and facilitating positioning, the ratchet gives some protection against moving the sheet more than one position at a time.

The numbers on the sheet are preferably arranged in rows which reflect normal fluctuations in stocks, such as might occur over a period of relatively stable market operations. Special indications, such as marks 46', which are preferably red to attract immediate attention are placed at various places on the sheet to indicate a change in the over-all market index, such as might be caused by war or general economic conditions. The red marks are intended to be only signals, however, and when one of them appears, a lottery may be resorted to either by using cards or a wheel or dial arrangement whereby instructions are given for moving the slide a certain number of index marks 42, in one direction or another. In the embodiment described only three marks are indicated but there preferably are more than three index positions. The index change will, in effect, simulate the major changes which do occur in the market from time to time. It should be observed that not all of the numbers in each column may be seen at one time in accordance with the preferred embodiment of this invention. As the slide is moved up, for example, previously hidden numbers at the top of the column may be seen, whereas numbers previously seen at the bottom of the column will be hidden. The reason for making opening 16 sufficiently large that a whole column may be seen at one time is thus rendered obvious. It will also be observed that the red marks 46' are placed on the sheet at various levels so that, in operating at the different index levels not all of the marks will come into view. This further increases the element of chance, making prediction of stock prices for a particular commodity practically impossible.

It is contemplated that, in playing the game, a broker will be selected to operate the board. The broker can also act as a banker for the purpose of changing money, etc. Each player will be given a certain amount of play money at the beginning of the game. There will be a limited number of shares of stock availble in separate printed certificates of various denominations. The players may buy these certificates and may trade among one another in accordance with rules which should be established before play is commenced. Preferably, the broker will indicate when the market is opened for trading and when it closes, which he can do, for example, by ringing a bell once upon opening and twice upon closing. When the exchange closes the sheet will be moved to change the price of stock.

An added element of interest may be interjected by the use of symbols, in addition to stock prices, such as, for example, blue dots arranged at different points in the various rows. Whenever a blue dot appears, a dividend is declared and a stockholder may demand payment of said dividend on some predetermined basis. Many refinements which may be made in the game are obviously possible for special situations.

The structure described herein has been described by way of example. Many modifications thereof will occur to those skilled in the art and all such modifications within the scope of the claims are intended to be within the scope and spirit of the present invention.

As previously indicated, the game device of the present invention may also be employed in connection with other types of games where comparing adjacent pairs of a multiplicity of symbols is required. Choice of the symbols used and their specific arrangement may vary within wide limits within the scope of the present invention.

I claim:

1. A game device comprising a sheet on a surface of which symbols are arranged in parallel columns and in equally spaced rows, and an indicator on which symbols are arranged in a column parallel to the columns on the sheet and in which column the symbols have the same spacing as the rows of symbols on the sheet, said sheet and indicator being supported relative to one another so that they are at all times movable, in their supported positions, relative to one another both in the direction of the rows and in the direction of the columns, said movements keeping the columns of the indicator and the sheet mutually parallel so that each symbol on the indicator may be compared with the various symbols on the sheet which appear adjacent to it.

2. A game device comprising a sheet on a surface of which symbols are arranged in parallel columns and in equally spaced rows and an indicator on which symbols are arranged in a column parallel to the columns on the sheet, there being fewer symbols in the column on the indicator than in the columns on the sheet, said symbols on the indicator being spaced the same as the rows of symbols on the sheet and said sheet and indicator being supported so that they are, in their supported positions, at all times relatively movable both in the direction of the rows and in the direction of the columns, the direction of the said movements keeping the columns on the indicator and the sheet mutually parallel so that each symbol on the indicator may be compared with the various symbols on the sheet which appear adjacent to it.

3. A game device comprising a frame, a tubular sheet on a surface of which symbols are arranged in parallel columns and in equally spaced rows generally perpendicular to the columns, said sheet being rotatable relative to the frame in a direction which parallels the rows of symbols, and an indicator on which is a column of symbols having the same spacing as the symbols in the columns on the sheet, there being fewer symbols in the column on the indicator than in the columns on the sheet, and said indicator being supported so that it is at all times movable, in its supported position, relative to the frame in a direction parallel to the columns, so that each symbol on the indicator may be compared with the various symbols on the sheet which appear adjacent to it.

4. A game device in accordance with claim 3 wherein the indicator includes a window through which columns on the sheet may be seen and adjacent which is the column of symbols on the indicator, said window being only sufficiently long to expose the same number of symbols of a column on the sheet as the total number of symbols in the column on the indicator.

5. A game device in accordance with claim 3 wherein the frame has a portion which covers the sheet except in the area of the indicator and the indicator includes a window through which columns on the sheet may be seen, the column of symbols on the indicator being adjacent to and spaced along said window and said window being only sufficiently long to expose the same number of symbols of a column on the sheet as the number of symbols in the column on the indicator.

6. A game device comprising a flexible sheet in tubular form bearing on its outer surface symbols arranged in parallel columns transverse to said tubular sheet and in equally spaced rows generally perpendicular to the columns and extending around said tubular sheet, a pair of rollers arranged within the tubular sheet to support said sheet and to produce its movement in the direction of the rows, a frame including means rotatably supporting said rollers parallel to one another and a cover for said tubular sheet, said cover having an opening through which a column on the sheet may be viewed and an indicator having a column containing somewhat fewer symbols than the columns on the sheet, said symbols on the indicator being spaced the same as the rows on the sheet and said indicator being supported so that it is at all times movable, in its supported position, relative to said frame parallel to the columns, so that each symbol on the indicator may be compared with the various symbols on the sheet which appear adjacent to it.

7. A game device in accordance with claim 6 wherein the indicator is a slide member closing the opening in the cover except for a window which is sufficiently long to leave uncovered only as many symbols in a column on the sheet as there are symbols in the column on the indicator.

8. A game device as described in claim 6 wherein one of the rollers is provided with a handle a portion of which extends beyond the cover whereby the tubular sheet may be turned relative to the indicator and an idler roller which is resiliently coupled to said roller to hold said sheet against said roller.

9. A game device for simulating stock market activity comprising a sheet bearing numbers representing stock prices arranged in parallel columns and in equally spaced rows and an indicator bearing a column containing names of stocks, the stocks being spaced the same distance apart as the rows of prices on the sheet, there being somewhat fewer stocks than there are prices in their respective columns on said sheet and indicator, the sheet and the indicator being supported relative to one another so that they are relatively movable at all times both in the direction of the rows and in the direction of the columns while keeping the column on the indicator and the columns on the sheet parallel so that each stock on the indicator may be compared with various prices on the sheet which appear adjacent to said stock.

10. A game device for simulating stock market activity comprising a sheet bearing numbers representing stock prices arranged in parallel columns and in equally spaced rows, a frame supporting the sheet in such a manner that it can move relative to the frame in the direction of the rows, a cover for the sheet forming part of the frame and covering the sheet except for an opening through which a complete column on the sheet may be viewed, and an indicator having a column of stock names, there being somewhat fewer of said names in the column than there are stock prices in the various columns on the sheet, the spacing between the stock names being the same as the spacing between the rows of prices, said indicator being slide mounted on the frame and being at all times movable relative thereto in the direction of the columns, the movement of the sheet and the indicator, respectively, permitting each stock name to be compared with various prices which appear adjacent to it.

11. A game device as described in claim 10 wherein the numbers representing stock prices within any row follow an orderly pattern of rise and fall from column to column such as would be experienced in normal trading.

12. A game device as described in claim 10 wherein numbers representing stock prices within any row follow an orderly pattern of rise and fall from column to column such as would be experienced in normal trading of stocks on the stock market and wherein the rows are so arranged that the average prices from row to row are materially different from one another so that movement of the indicator relative to the column will, in effect, simulate a change in overall market conditions.

13. A game device for simulating stock market activity comprising a flexible sheet of tubular form bearing numbers representing stock prices arranged in parallel columns transverse to the tubular member and in equally spaced rows generally perpendicular to the columns and extending around the tubular sheet, a pair of parallel rollers arranged within the tubular sheet to support said sheet and to produce its movement in the direction of the rows, a frame including means for rotatably supporting said rollers parallel to one another, and including a cover for the sheet covering the sheet except for an opening through which a complete column on the sheet may be viewed, and an indicator mounted to slide relative to the cover and closing the opening in the cover, said indicator bearing a column containing stock names arranged parallel to the columns of stock prices, there being somewhat fewer of the names than there are stock prices in the columns on the sheet, a window in the slide adjacent the stock names just long enough to show as many stock prices as there are stock names, whereby rotation of the roller will cause the sheet to move relative to the frame in the direction of the rows and the sliding of the indicator will cause the window to be moved relative to the cover parallel to the columns, said movements permitting each stock name to be compared with various prices which appear adjacent to it.

14. A game device as described in claim 13 wherein an idler roller is mounted to resiliently contact one of the parallel rollers in a position where the sheet may be fed between it and said roller in order to insure that the rotation of said roller will produce movement of the sheet and a handle for producing rotation of that roller in contact with the idler roller to cause movement of said sheet, at least a portion of said handle extending beyond the cover.

15. A game device as described in claim 13 wherein numbers in any row from column to column follow an orderly path of rise and fall so that movement of the sheet will simulate changes in the price of stocks in the course of normal trading on the stock market and wherein the rows are so arranged that the average prices from row to row are materially different from one another so that movement of the indicator will simulate a change in overall market conditions.

References Cited in the file of this patent

UNITED STATES PATENTS

| | | |
|---|---|---|
| 1,608,098 | Hall | Nov. 23, 1926 |
| 1,750,539 | Paulson | Mar. 11, 1930 |
| 2,071,288 | Thompson | Feb. 16, 1937 |
| 2,299,284 | Steidemann | Oct. 20, 1942 |
| 2,646,220 | Weiser | July 21, 1953 |